United States Patent
Kazem

(10) Patent No.: US 8,350,520 B2
(45) Date of Patent: Jan. 8, 2013

(54) SYSTEM AND METHOD FOR A SELF-CHARGING BATTERY CELL

(76) Inventor: Ismail Kazem, Tampa, FL (US)

( * ) Notice: Subject to any disclaimer, the term of this patent is extended or adjusted under 35 U.S.C. 154(b) by 471 days.

(21) Appl. No.: 12/753,074

(22) Filed: Apr. 1, 2010

(65) Prior Publication Data

US 2011/0241600 A1    Oct. 6, 2011

(51) Int. Cl.
*H01M 10/46* (2006.01)
*H01L 35/30* (2006.01)
*G21H 1/00* (2006.01)

(52) U.S. Cl. ......... 320/101; 320/115; 976/DIG. 411; 976/DIG. 437; 136/205; 136/291; 136/292; 136/293; 310/303; 310/50

(58) Field of Classification Search ........... 320/101
See application file for complete search history.

(56) References Cited

U.S. PATENT DOCUMENTS

| 3,836,798 | A | * | 9/1974 | Greatbatch | 310/303 |
| 4,175,249 | A | * | 11/1979 | Gruber | 323/271 |
| 5,235,232 | A | * | 8/1993 | Conley et al. | 310/303 |
| 5,721,462 | A | * | 2/1998 | Shanks | 310/303 |
| 5,859,484 | A | * | 1/1999 | Mannik et al. | 310/303 |
| 6,238,812 | B1 | * | 5/2001 | Brown et al. | 429/5 |
| 6,949,865 | B2 | * | 9/2005 | Gadeken | 310/303 |
| 7,417,356 | B2 | * | 8/2008 | Luo et al. | 310/301 |
| 2005/0029903 | A1 | * | 2/2005 | Tadayon et al. | 310/314 |
| 2006/0244410 | A1 | * | 11/2006 | Hacsi | 320/101 |

* cited by examiner

*Primary Examiner* — Yalkew Fantu
(74) *Attorney, Agent, or Firm* — Kenyon & Kenyon LLP

(57) ABSTRACT

A system and method for a self-charging battery cell are provided in which beta emissions from a Strontium-90 source are obtained by a sensor device and converted into electric energy. In embodiments, a scintillation device is used to intake emissions from a Strontium-90 source, and consequently emit a light or plurality of light flashes. A sensor device, e.g., a photodiode, is utilized to convert the light or plurality of light flashes into electric voltage, current and/or energy.

18 Claims, 8 Drawing Sheets

SYSTEM AND METHOD FOR A SELF-CHARGING BATTERY CELL

FIELD OF INVENTION

The present invention relates generally to using existing emissions to obtain electric energy.

BACKGROUND

Energy conservation and use are hotly discussed topics. Traditionally, electric energy has been transformed, for example, from heat, water, wind, coal, and manmade chemical reactions. Such resources are currently plentiful, however, many must be resourced and replenished for the continued obtainment of electric energy. Consequently, scientists have looked elsewhere for additional sources of electric energy, especially sources which may be readily converted and in a clean fashion, or, if possible, recycling used resources.

Various battery types are available in the current market. Some may use an energy source which provides energy from a beta voltaic effect. Beta decay of electrically charged particles is used to provide energy. A beta decay is electrically charged particle expelled from a nucleus. A moving charged particle, such as beta decay, yields a magnetic field. Energy is stored in the magnetic field. When the moving charged particle is absorbed, for example, the magnetic field essentially collapses and produces an electromagnetic field (EMF). The energy released from this event is very large. Such is referred to as the beta voltaic effect. In embodiments of the present invention, this effect is utilized as an energy source for a contained energy device such as a battery.

For example, in an impedance/capacitor/resistance ("LCR") resonant tank circuit system, from energy of a beta voltaic effect, the LCR tank circuit oscillates at a self-resonating frequency. The energy is then removed through a high-quality transformer impedance in the circuit, thus ultimately providing energy from beta decay. Unfortunately, the LCR system requires the use of various components which can fail overtime, long before the energy source is depleted. This then can lead to a waste of useful energy sources, as well as of other robust components of the battery system such as, for example, the protective housing.

Some attempts at using nuclear sources were based on thermo-electric generators, providing additional resource waste.

Accordingly, there exists a need for such additional sources and methods for energy conversion. Further, there exists a need for methods which provide for a recharging of energy sources. Further, there exists a need for systems which provide for longer lasting components, or redundancy in components, for long-lasting energy sources.

SUMMARY OF THE INVENTION

The present invention provides a system and a method for safe and proper use of materials for transforming into electric energy. The present invention provides a system and a method for safe and proper storage of materials for transforming into electric energy.

The present invention provides for a system and a method for recharging a power source for a battery cell or the like. The present invention provides for a system and a method for self-recharging of a power source for a battery cell or the like.

Embodiments of the present invention provide for a method and system for the production of a self charging electric cell with a long shelf life. For example, Strontium-90 (Sr-90) radionuclide is a nuclear byproduct or waste product that emits beta electrons with a half-life of 28.8 years. In embodiments of the present invention, the emitted electrons can be applied efficiently in generating electricity. For example, the emitted electrons can be applied into a lithium ion or other cell needing electrons for recharging purposes. For example, the emitted electrons can be applied to ionizing water to supply hydrogen molecules to a nickel-hydrogen or other cell needing hydrogen molecules. For example, the emitted electrons can be converted directly into electric energy for subsequent use.

Embodiments of the present invention provide for portable containment of an essentially self-charging battery cell. Embodiments of the present invention can be used to provide stored energy for use during times of extra consumption needs. Embodiments of the present invention provide for a relatively inexpensive and efficient provision of stored energy.

Embodiments of the present invention provide a method and system for a self-charging battery cell, having a Strontium-90 source, the Strontium-90 source having a beta emission. A sensor device is activated by the beta emission. The sensor device converts an intake from the beta emission into electric energy. The electric energy generated by the sensor device can be in the form of electric current, electric voltage, and/or electric power.

In embodiments of the present invention, the sensor device is at least one of a semiconductor light sensor, a thermoelectric heat sensor, a photodiode, PMT, and/or a photocell.

Embodiments of the present invention provide a method and system for a self-charging battery cell which is usable in a Lithium ion cell. Embodiments of the present invention provide a method and system for a battery cell which is configured to restore a Lithium ion cell to full charge using the generated electric energy from the Strontium-90 source. Embodiments of the present invention are used in a plurality of Lithium ion cells.

In embodiments of the present invention, the radionuclide Sr-90 is used. The half-life of Sr-90 has been determined to be 28.8 years. The decay scheme of Sr-90 is: Sr-90→Yitrium-90→Zirconium-90 (stable). The beta emissions from the first and second steps in the decay are 0.546 MeV and 2.28 MeV, respectively.

Embodiments of the present invention provide for a method and system for a battery cell having a Strontium-90 source. The beta emission of a Strontium-90 source is converted into light using a scintillation device. The light then activates a sensor—whether by the frequency of the light, by the heat of the light, or by another property of the light which can be sensed by a sensor. The sensor then converts the light into at least one of electric current, voltage, energy, and power. Such electricity in its generated form can then be used to power small or large electricity-needing devices, as designed.

In embodiments of the present invention, the scintillation device is at least one of a scintillation crystal, an organic scintillation crystal, and an inorganic scintillation crystal. In embodiments of the present invention a scintillation device is used to convert electrons from a beta emission of a Strontium-90 source into one or more one flashes of light.

In embodiments of the present invention, at least one scintillation device is disposed near at least one Strontium-90 source. In embodiments of the present invention, the scintillation device is disposed near enough to the Strontium-90 source that the scintillation device can intake electron(s) from the at least one beta emission from the Strontium-90 source and convert the at least one beta emission into light. In embodiments of the present invention, at least one sensor device is disposed near the at least one scintillation device. In embodiments of the present invention, the sensor device is disposed near enough to the scintillation device so that the sensor device can be activated by the light emitted by the scintillation device. In embodiments of the present invention, the sensor device converts the received light into electric energy.

In embodiments of the present invention, the scintillation device is at least one of a scintillation crystal, an organic scintillation crystal, an inorganic scintillation crystal.

In embodiments of the present invention, one or more scintillators are used. A scintillator is a material which, when excited by ionizing radiation, exhibits luminescence. For example, when such luminescent material is struck by an incoming ionizing radiation particle, the luminescent material absorbs the energy of the of the striking particle, and then emits that absorbed energy as light. For example, the light is a small flash of light in the visible range. In addition or in the alternative, the light is in the nonvisible range. Generally, scintillators have a high efficiency for converting energy, as well as a short rise time which allows it to be used in fast timing applications. Example scintillators include: organic scintillators (e.g., aromatic hydrocarbon compounds containing linked or condensed bezene ring structures), pure crystals (e.g., anthacene, stilbene, and naphthalene), organic liquids (e.g., organic scintillator in an organic solvent), plastic (e.g., polymerized solution of organic scintillators), in organic crystals (e.g., alkali metal halides with a small activator impurity (e.g., thallium)), and gaseous scintillators (e.g., nitrogen and the noble gases such as helium, argon, krypton, etc.).

In embodiments of the present invention, various devices can be used to receive, convert, and/or use the emitted light from a device such as a scintillator. For example, a photomultiplier tube (PMT), photocell, and/or photodiode can be used. A photomultiplier tube effectively absorbs the emitted light, and emits it in the form of electrons. The electrons may then result in an electrical pulse.

In embodiments of the present invention, the Strontium-90 is essentially sandwiched between at least two scintillation devices. In embodiments of the present invention, at least one sensor device is disposed adjacent or near to each of the at least two scintillation devices.

In embodiments of the present invention, a Strontium-90 source is surrounded by at least one scintillation device which forms an effective cylindrical wall around the Strontium-90 source. In a further embodiment, at least one sensor device is disposed outside the effective cylindrical wall.

Embodiments of the present invention provide for a battery cell housed in a compact sealed container. Embodiments of the present invention wherein the battery cell is used to at least one of recharge existing battery cells and/or serve as the battery cell to provide electric energy for an existing device or electronic device.

Embodiments of the present invention provide for a battery cell method and system having a Strontium-90 source, the Strontium-90 source having a beta emission, and exposing at least one water molecule $H_2O$ to the Strontium-90 beta emission. In embodiments, the Strontium-90 beta emission effects a production of hydrogen from the at least one water molecule.

Embodiments of the present invention provide for charging a nickel-hydrogen battery cell with the production of hydrogen.

Embodiments of the present invention provide for a longlife, inexpensive, reliable, relatively easy to make, and relatively easy to use system and method. Strontium-90 is a product or waste product of a nuclear reaction, and is converted into a useful source from which electric current/voltage can be obtained in embodiments of the present invention.

It is appreciated that in the embodiments disclosed herein, each of the features such as a sensor or sensor device, a scintillation device, and a source of the beta emission of electrons can each/some/all be solo devices used within a system or method, or can be a plurality of one or more devices used within a system or method. It is also understood that other and/or additional sources can be used. For example, a source that behaves in a similar useful manner as Strontium-90 can be used in conjunction with or in place of Strontium-90.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1A:
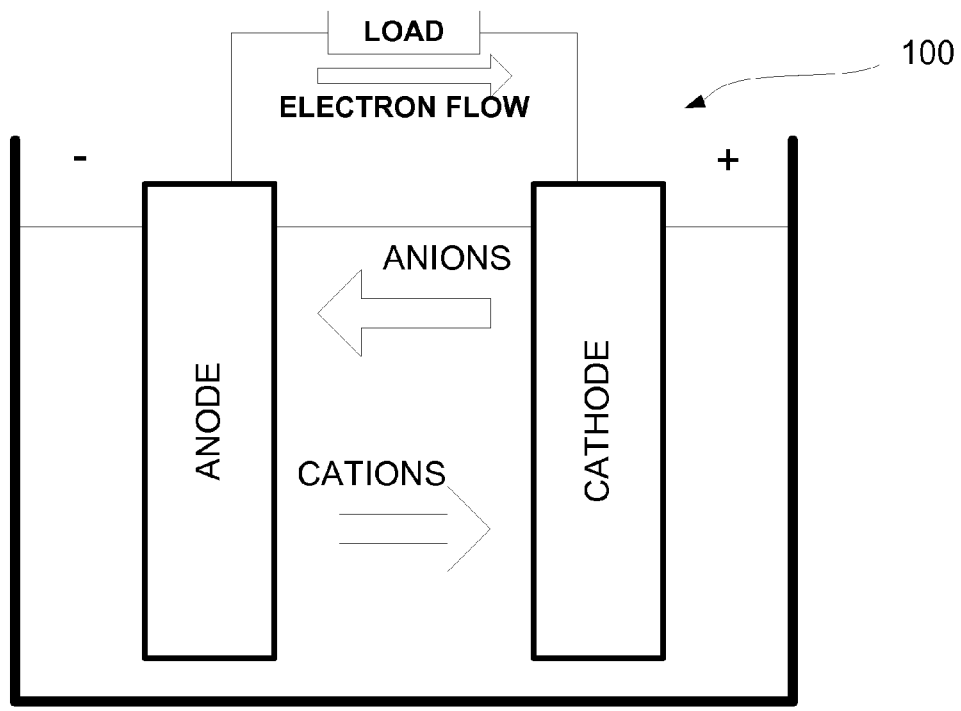
FIG. 1A shows a diagram of an example discharging battery cell system.
Figure 1B:
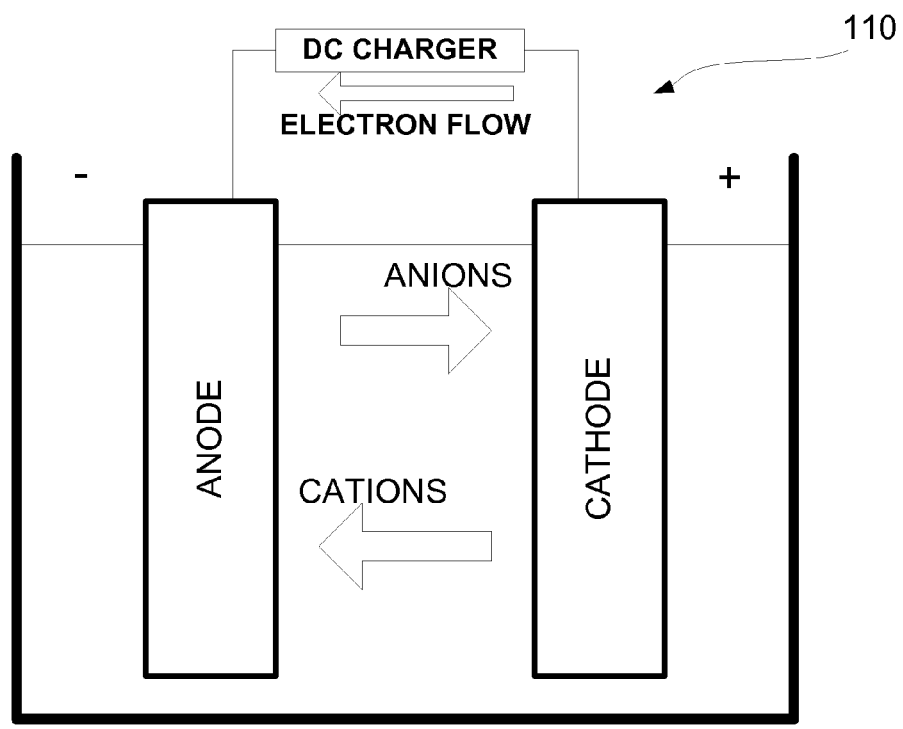
FIG. 1B shows a diagram of an example recharging battery cell system.

FIG. 1A illustrates a diagram of an example battery cell system 100 according to available systems. Specifically, the diagram shows a discharging battery cell system which indicates the basic functionality of the resulting flow of electrons for use. FIG. 1B illustrates a diagram of an example battery cell system 110 according to available systems. Specifically, the diagram shows a recharging battery cell system which indicates the basic functionality of the resulting flow of electrons.

In embodiments of the present invention, Sr-90 (or a source having such emissions) provides beta emissions which can be used to produce hydrogen molecules for a nickel-hydrogen battery cell system. In an embodiment, water or other hydrogen compound is exposed to the beta emissions of Sr-90. Those beta emissions have an ionizing effect on the hydrogen compound, thus releasing the bond between at least the hydrogen and the oxygen in $H_2O$, for example. That is:

$$H_2O \rightarrow H + OH^-$$

The hydrogen molecule is then provided by available means in the battery cell system to re-supply the hydrogen source, thus, effectively in-part recharging the battery. For a nickel-hydrogen battery cell (Ni—$H_2$), during normal operation, the reaction of the nickel-hydrogen cell is as follows:

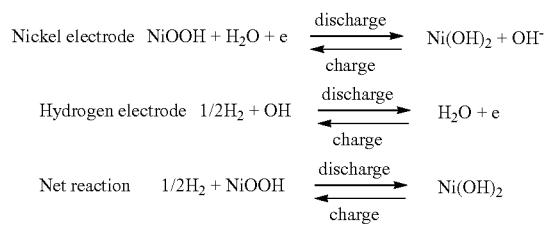

Thus, embodiments of the present invention can be used to produce hydrogen to the hydrogen electrode. Various embodiments are contemplated regarding how to dispose of the remnant hydrogen oxide, for example, it could be released in its gaseous state. Or, it could be combined with other remnants to form water molecules or other molecules to provide more hydrogen mining efforts for use in recharging the nickel-hydrogen battery cell, or for other uses such as other battery cell systems, or for other purposes needing hydrogen molecules.

Embodiments of the present invention can be used in alternative ways/methods. For example, the beta emissions of Sr-90 can be used to produce "recharging" electrons for a lithium ion cell. For example, the reaction of a lithium-ion cell is as follows:

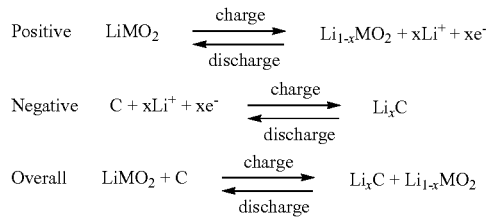

In such embodiments, the Sr-90 emits a beta emission. The beta emission includes electrons which can be directly used to recharge the electrons used in the lithium ion battery cell. Such process can be used with other battery cells, e.g., $ZnCl_2$ cell, nickel-cadmium cell, which require electrons for recharging.

In embodiments of the present invention, since the half-life of Sr-90 is about 28.8 years, that provides an effective self-charging battery—at least for those parts chargeable by the Sr-90 as described herein—for several years.

In embodiments of the present invention, the beta emission of the Sr-90 requires light shielding. Thus, the inclusion of the Sr-90 source in a compact sealed container assists this requirement. In embodiments of the present invention, the Sr-90 battery cell embodiments of the present invention can be housed in a compact sealed container. For embodiments of the present invention, radiation safety regulations are adhered to in the use of proper materials to house and/or store nuclear products such as Sr-90. For example, the Radiation Safety and Security may control the distribution and disposal of the battery cell containing Sr-90 or other energy source having similar properties by registration.

Figure 2:
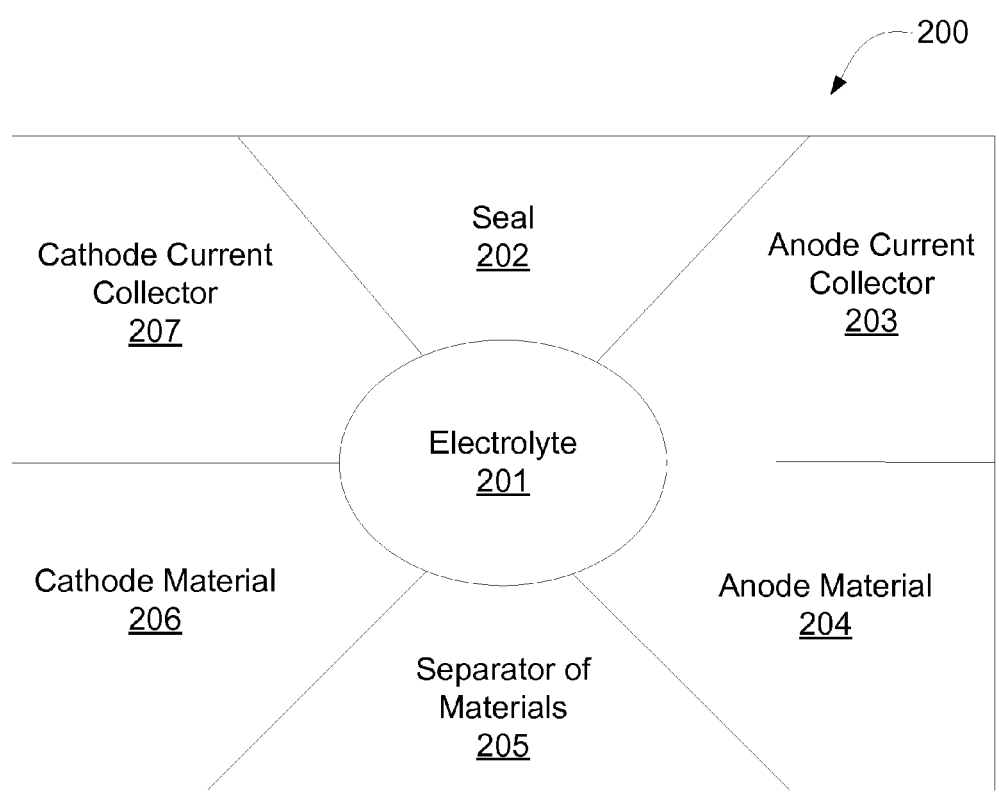
FIG. 2 shows a diagram of an example battery cell housing.

FIG. 2 shows a diagram of an example battery cell housed in a sealed container 200. For example, inside a battery cell housing 208, there is cathode material 206 and anode material 204. For each, respectively, there is a current collector: cathode current collector 207 and anode current collector 203. In the battery cell housing 208, there is a separator 205 to keep separate the cathode material 206 and the anode material 204. The electrolyte 201 is the source for the energy, when activated, of the battery cell. For safety purposes, there are container seals 202 within the battery cell housing 208 to keep the various materials from creeping unnecessarily into each other and outside the battery cell housing 208.

In embodiments, a battery housing is used which protects against leakage of the specific materials to be placed inside. For example, if Sr-90 is used, the battery housing or container is one which prevents radiation leakage. In embodiments, the battery housing is provided with a registration number so that the battery and contents are not misused. The registration number is provided to a safety committee or team which keeps track of the Sr-90 source batteries.

In embodiments, the Sr-90 source is pure. In an embodiment, the Sr-90 source is combined with another material to make it easier to use and/or manipulate. For example, the Sr-90 source is provided in an alloy with silver or another metal. By combining Sr-90 with one or more metals or other elements, it can make the manipulation and use of the Sr-90 easier. In embodiments, the manipulation and handling of the Sr-90 can be effected by a machine.

Figure 3:
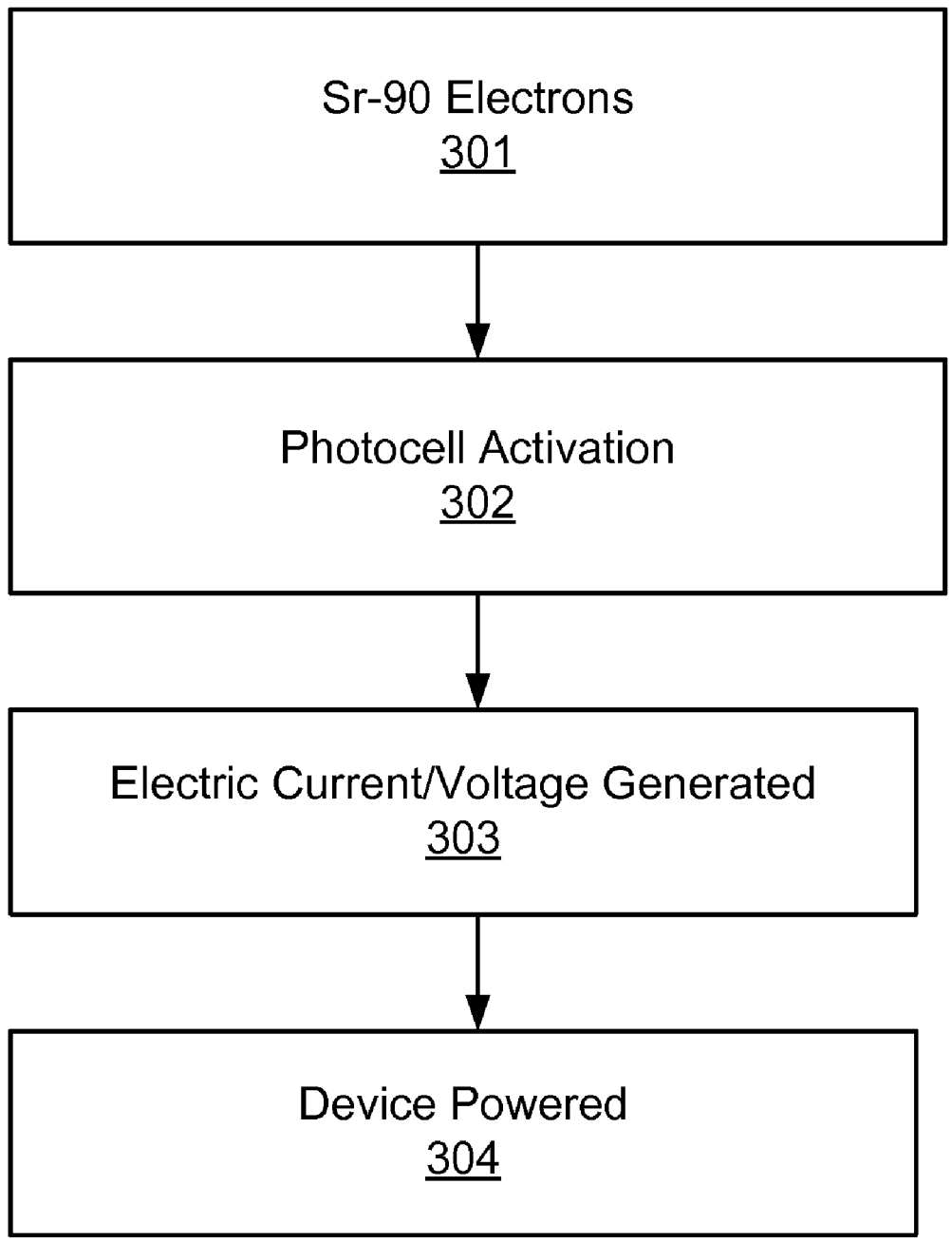
FIG. 3 shows a flow chart of an embodiment of the present invention.

FIG. 3 shows a flow chart of an embodiment of the present invention. In FIG. 3, a high-level view of the charging/recharging process is shown. In step 301, the source Sr-90 electrons are provided via the Sr-90 beta emissions. In step 302, a photocell, for example, is activated by the Sr-90 electrons. The photocell or other applicable device for accepting the beta emissions and translating that into a form that can be transmitted or used is usable. In the present case of the photocell, the photocell is activated by the Sr-90 electrons, and in response electric voltage or current is provided 303. Such electric voltage or current can then be used to power a device or machine 304. Alternatively, such electric voltage or current can be combined with other voltage or current sources.

Figure 4:
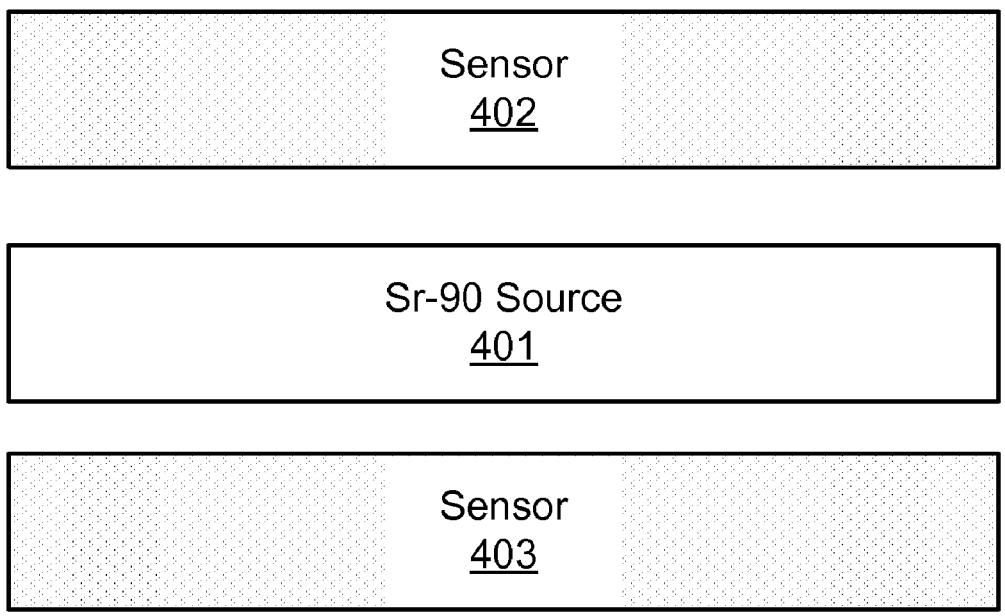
FIG. 4 shows a side view of an embodiment of the present invention.

FIG. 4 shows a side view of an embodiment of the present invention. In FIG. 4, a source, i.e., Sr-90, 401 is shown situated between photocells 402, 403. The photocells 402, 403 can be one elongated photocell which wraps around the source. Alternatively, the photocells 402, 403 can be more than one photocell. Alternatively, the photocells 402, 403 is a plurality and/or grid of photocells.

Figure 5:
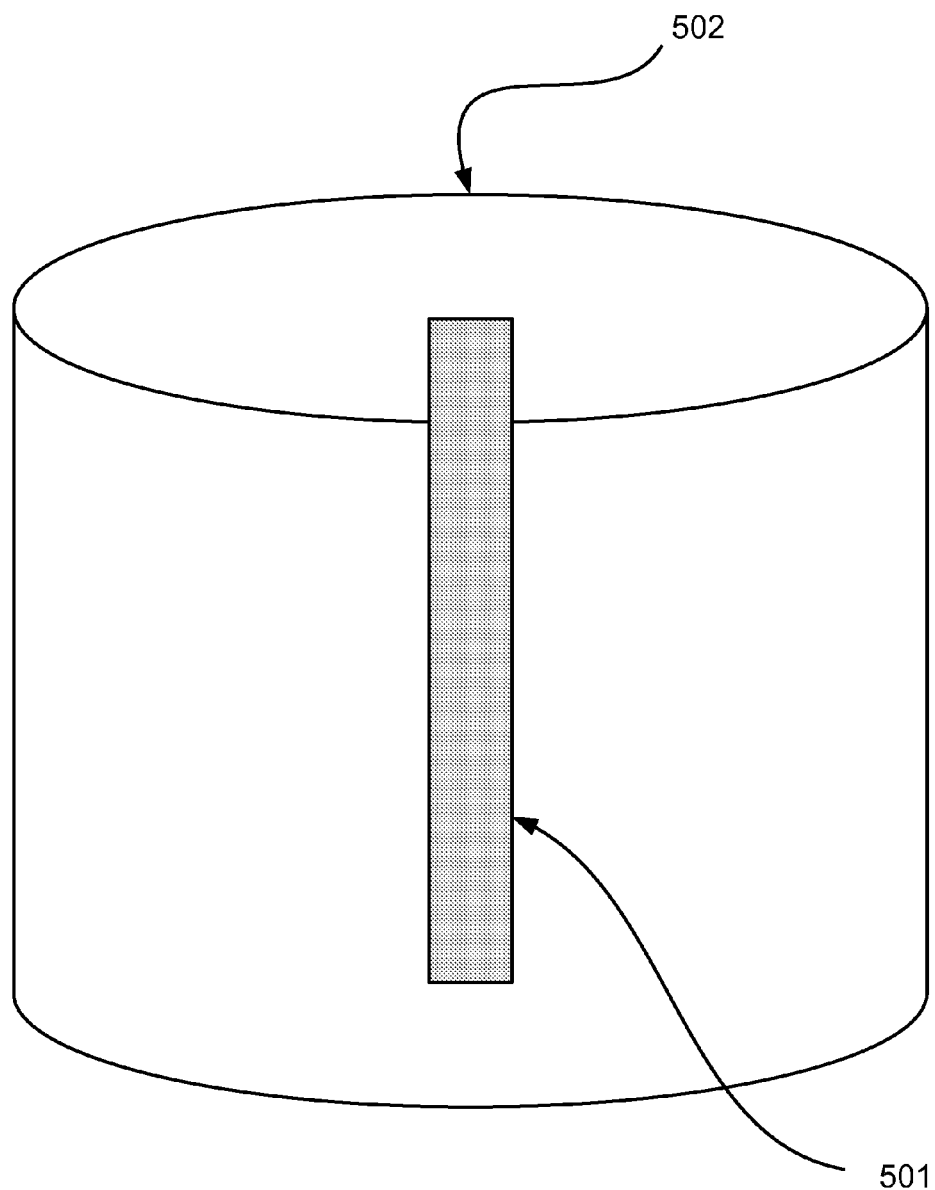
FIG. 5 shows a cylindrical-shaped example of an embodiment of the present invention.

FIG. 5 shows a cylindrical-shaped example of an embodiment of the present invention. In FIG. 5, a source 501, e.g., Sr-90, is surrounded by one or more photodiodes 502. For example, the one or more photodiodes 502 is a grid of photodiodes. Alternatively, the grid of photo diodes is usable in different shapes which cover some or all of the available space of the Sr-90 source. In an embodiment, the photodiode (s) are placed as near to the Sr-90 source as possible so that the flow of electrons is sufficiently encouraged towards the photodiodes.

Figure 6:
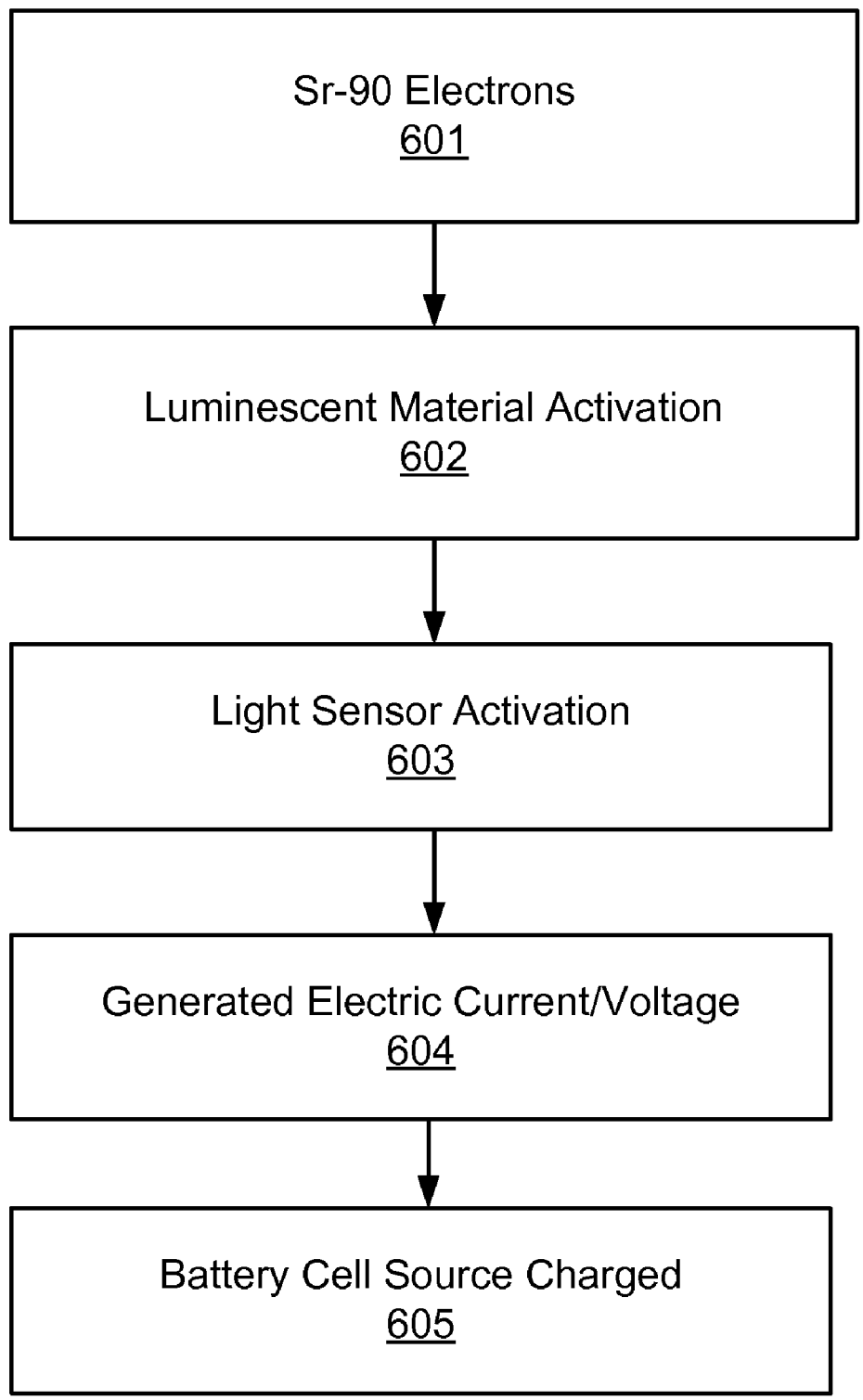
FIG. 6 shows a flow chart of an embodiment of the present invention.

FIG. 6 shows a flow chart of an embodiment of the present invention. In FIG. 6, the source Sr-90 electrons or beta emission are provided 601. A scintillator or other such device receives 602 the electrons from the source. The electrons excite or activate the scintillator or other such device and consequently, emit or exhibit luminescence or light. This light then activates a photodiode or such device 603 into producing electric voltage and/or current 604. The electric voltage and/or current can then be used to activate a machine or device, or be combined with other power sources, or be put to use to charge and/or activate an electrolyte or battery cell 605.

Figure 7:
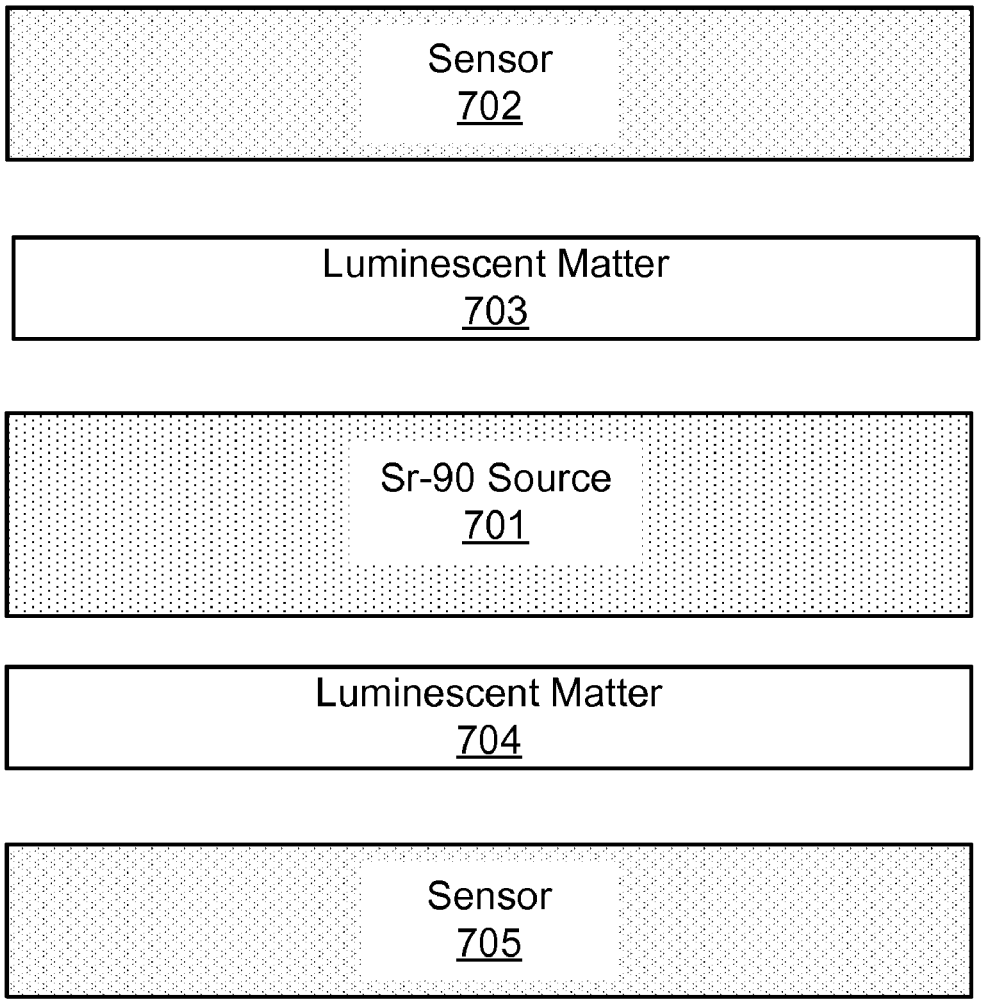
FIG. 7 shows a side view of an embodiment of the present invention.

FIG. 7 shows a side view of an embodiment of the present invention. In FIG. 7, an energy source 701, e.g., Sr-90, is shown disposed between one or more luminescent materials 703, 704. Such luminescent material(s) 703, 704 can be one or more type of scintillators. For example, an organic and an inorganic scintillators can be used. Or, for example, one or more inorganic scintillators can be used. A discussion concerning some of the available scintillators is included herein and can be used in embodiments of the present invention. Adjacent or near to the luminescent material 703, 704 is one or more photodiodes 702, 705. The one or more photodiodes 702, 705 is disposed close enough to the luminescent material in order to receive the light sufficiently in order to transform the light into electric voltage or current. In embodiments, a photocell or PMT or other such device that can intake luminescence or light and transform that into electric current/voltage/energy, can be used in place of or in addition to the photodiode.

Figure 8:
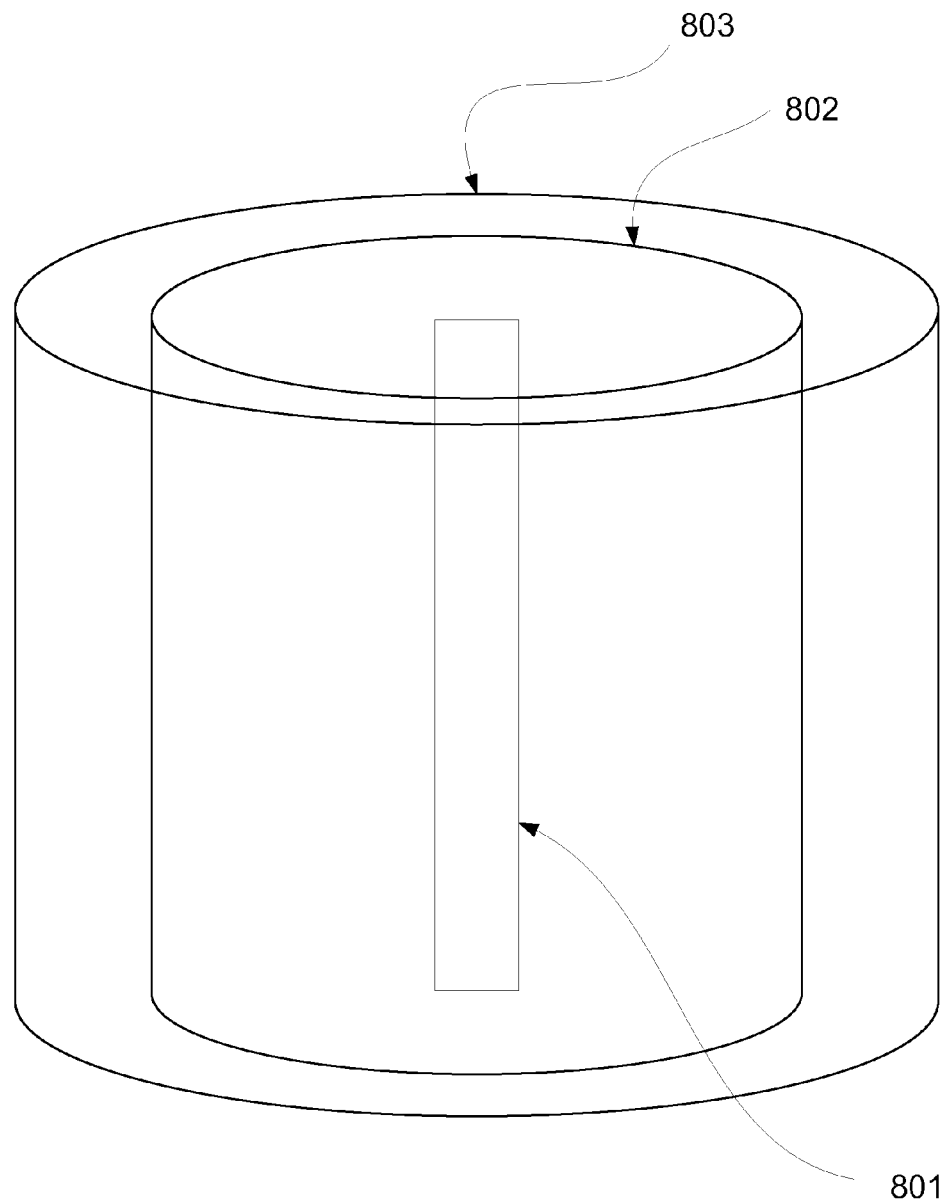
FIG. 8 shows a cylindrical-shaped example of an embodiment of the present invention.

FIG. 8 shows a cylindrical-shaped example of an embodiment of the present invention. In FIG. 8, an energy source 801, e.g., Sr-90, is surrounded completely or in part by one or more luminescent materials 802. In embodiments, the one or more luminescent materials 802 is one or more types of scintillators. The one or more luminescent materials 802 is surrounded completely or in part by one or more light/heat sensor devices, e.g., a photodiode, photocell, PMT, etc.

In embodiments of the present invention, the volume of Sr-90 to be used in a specific battery depends upon the type and use of the battery. For example, in batteries for large machinery, a larger amount of Sr-90 may be used—relative to that used in a battery for a small handheld machine—in order to increase the amount of beta emissions which are detected by the luminescent material and/or sensors for the generation of electric current and/or voltage. Accordingly, for any specific situation, the volume of Sr-90 can be determined in a calculation of energy needs, battery housing size, number of sensors/detectors, etc.

It should be understood that there exist implementations of other variations and modifications of the invention and its various aspects, as may be readily apparent to those of ordinary skill in the art, and that the invention is not limited by specific embodiments described herein. Features and embodiments described above may be combined with and/or without each other. It is therefore contemplated to cover any and all modifications, variations, combinations or equivalents that fall within the scope of the basic underlying principals disclosed and claimed herein.

What is claimed is:

1. A method for a self-charging battery cell, comprising: providing a Strontium-90 source, the Strontium-90 source having a beta emission; activating a sensor device by the beta emission; generating electric energy by the sensor device from the beta emission, wherein the sensor device converts an intake from the beta emission into electric energy; and the self-charging battery cell is configured to restore a Lithium ion cell to full charge using the generated electric energy from the Strontium-90 source.

2. The method of claim 1, wherein the sensor device is at least one of a semiconductor light sensor and a thermoelectric heat sensor.

3. The method of claim 2, wherein the sensor device is at least one of a photodiode and a photocell.

4. The method of claim 3, wherein the sensor device is configured to convert light into at least one of electric current and voltage.

5. The method of claim 1, wherein the self-charging battery cell is used in a Lithium ion cell.

6. A method for a self-charging battery cell, comprising: providing a Strontium-90 source, the Strontium-90 source having a beta emission; converting the beta emission into light using a scintillation device; activating a sensor device by the light converted by the scintillation device; and converting the light into electric energy by the sensor device; wherein the self-charging battery cell is used in a Lithium ion cell.

7. The method of claim 6, wherein the scintillation device is at least one of a scintillation crystal, an organic scintillation crystal, and an inorganic scintillation crystal.

8. The method of claim 6, wherein the scintillation device converts electrons from the beta emission into at least one flash of light.

9. The method of claim 8, wherein the sensor device is at least one of a photodiode and a photocell.

10. The method of claim 8, wherein the sensor device is configured to convert light into at least one of electric current and voltage.

11. A system for a self-charging battery cell, comprising: at least one Strontium-90 source, the at least one Strontium-90 source having at least one beta emission; at least one scintillation device, the at least one scintillation device being disposed near the at least one Strontium-90 source; at least one sensor device, the at least one sensor device being disposed near the at least one scintillation device; wherein the at least one scintillation device is disposed near enough to the at least one Strontium-90 source so that the at least one scintillation device can intake electrons from the at least one beta emission and convert the at least one beta emission into light.

12. The system of claim 11, wherein the at least one sensor device is disposed near enough to the scintillation device so that the at least one sensor device is activated by the light, the at least one sensor device being configured to convert the light into electric energy.

13. The system of claim 12, wherein the scintillation device is at least one of a scintillation crystal, an organic scintillation crystal, an inorganic scintillation crystal.

14. The system of claim 12, wherein the Strontium-90 source is sandwiched between at least two scintillation devices, and the at least one sensor device is disposed adjacent to each of the at least two scintillation devices.

15. The system of claim 12, wherein the Strontium-90 source is surrounded by the at least one scintillation device, the at least one scintillation device forming an effective cylindrical wall around the Strontium-90 source, and the at least one sensor device being disposed outside the effective cylindrical wall.

16. The system of claim 12, wherein one or more of the battery cell is housed in a compact sealed container.

17. The system of claim 12, wherein the battery cell is used to at least one of recharge existing battery cells and serve as the battery cell to provide electric energy for an electronic device.

18. A method for a battery cell, comprising: providing a Strontium-90 source, the Strontium-90 source having a beta emission; exposing at least one water molecule ($H_2O$) to the Strontium-90 beta emission, wherein the Strontium-90 beta emission effects a production of hydrogen from the at least one water molecule; further comprising: charging a nickel-hydrogen battery cell with the production of hydrogen.

* * * * *